May 9, 1961     H. B. SAPP     2,983,208

RANGEFINDER SYSTEM

Filed July 30, 1958     3 Sheets-Sheet 1

HUBERT B. SAPP
INVENTOR.

BY
ATTORNEYS

May 9, 1961 H. B. SAPP 2,983,208
RANGEFINDER SYSTEM
Filed July 30, 1958 3 Sheets-Sheet 2

HUBERT B. SAPP
INVENTOR.

BY R. Frank Smith
F. M. Emerson Holmes
ATTORNEYS

United States Patent Office 2,983,208
Patented May 9, 1961

2,983,208
RANGEFINDER SYSTEM

Hubert B. Sapp, Rochester, N.Y., assignor to Eastman Kodak Company, Rochester, N.Y., a corporation of New Jersey Filed July 30, 1958, Ser. No. 752,018

3 Claims. (Cl. 95—44)

This invention relates to rangefinders for photographic cameras. Primarily it relates to the means for coupling the rangefinder adjusting mechanism to the focusing mechanism of the camera.

It is the object of the invention to provide a highly accurate rangefinder. It is a particular object of the invention to provide an inexpensive arrangement to permit adjustment both of the infinity setting and the calibration of the rangefinder mechanism during manufacture so as to compensate for all errors which might occur in the manufacture and assembly of the parts.

There is no point in having greater precision in ranging than is required for photography with the lens set at its greatest aperture. Nevertheless, simple rangefinders which are pre-adjusted only for the infinity setting are not uniformly accurate and prior to the present invention, camera rangefinders which were accurately calibrated throughout their scale were prohibitively expensive.

Rangefinding with a short base rangefinder of the size normally built into a camera is a fairly precise operation and the parts of the rangefinder and other lens focusing mechanisms are always held within close tolerances. Furthermore it is customary to assemble the camera and the rangefinder and then to adjust the infinity setting of the rangefinder and also the vertical adustment or "halving" so that the two images seen in the rangefinder are in close vertical alignment. One of the images is moved horizontally for ranging, of course. However, even after a rangefinder has been carefully calibrated and adjusted in this manner to correct the infinity setting, the finder may be inaccurate at some closer setting, say 4 feet. This discrepancy may be due to any of a number of causes including slight variations in the focal length of the lens, slight variations in the shape of some cam in the system even though it is held within close tolerances or slight differences in the effective lengths of levers or effective pitch of screw threads involved in the coupling system. The object of the present invention is to correct quickly, easily and inexpensively these second order errors, so that the rangefinder will be accurate both at infinity and at some close setting, say 4 feet. Any residual errors at intermediate settings or closer than 4 feet would be third or fourth order errors and in practice are completely negligible.

Since distant objects are usually not of optimum interest, the present invention may be applied so as to have the system absolutely precise at say 4 feet and 15 feet (rather than infinity) but, since the residual errors are completely negligible anyway the effect is the same. Furthermore it is customarily for the camera owners to check the infinity setting, because this can be done quite easily, merely by checking on a very distant object. Accordingly the present invention is applied to two settings, one of which is preferably infinity.

The basic concept is one of rate adjustment in a system of levers. From this fundamental point of view, the object of the invention is to permit an adjustment to be made at some second setting of the system, without disturbing the adjustment previously made at some preselected first setting.

According to the present invention, the above advantages are obtained in a camera having a focusing mechanism and having a range cam connected to and moved by the focusing mechanism. The rangefinder has the usual "fixed" mirror and "movable" mirror and means for mounting the two mirrors separated and parallel at one setting of the movable mirror which is, of course, the infinity setting. For convenience in discussing the relative orientation of parts, the range plane or triangulation plane of the rangefinder is normally referred to as horizontal and the mirrors are then in vertical planes. Obviously the camera may be pointed in any direction so that the ranging plane may not be parallel to the earth, but nevertheless it is convenient to refer to this plane as horizontal.

The movable mirror is mounted to rotate about a vertical pivot for ranging. The support for the whole system is the camera itself or some plate rigidly attached to the camera. According to the invention, a cam follower or second member is pivoted on the support to be rotated by the cam. This second member includes a straight arm rigidly extending therefrom with a pusher element such as a spherical knob mounted on and adjustable along the arm. This pusher element engages a flat surface on the movable mirror, or more exactly on the mounting means of the movable mirror, for rotating the mirror on its vertical pivot when the second member is rotated by the range cam. That is, turning the camera focusing mechanism and the range cam connected thereto, causes the second member and its straight arm to rotate. The pusher element on the straight arm then moves the movable mirror. A spring or other means is provided for urging the movable mirror mount into contact with the pusher element. One particularly important feature of the invention lies in the fact that the straight arm on the second member and the surface of the movable mirror mount engaging the pusher element are strictly parallel when the two mirrors are parallel, that is, at the infinity setting. This is the feature which cuts the assembly cost and at the same time improves the precision of the instrument.

The camera is assembled with the straight arm and the controlled surface parallel and the lens focused on infinity. One or the other of the mirrors is then adjusted, usually by a suitable set screw to make the two mirrors parallel. The halving adjustment is usually also made at the same time on one or the other mirror. Movement of the pusher element up and down the straight arm parallel to the control surface, does not affect this infinity setting in any way. The camera is then focused for some near distance, say 4 feet, and the pusher element is moved to the position on the straight arm which adjusts the rangefinder to read correctly at 4 feet. Since this latter adjustment does not affect the infinity setting in any way, the whole system is now precisely adjusted for both infinity and 4 feet.

Also in a preferred embodiment of the invention a single spring can be used for urging the movable mirror system against its pivot and for urging the control surface against the pusher element. It is convenient also to have the pivot axis of the second member approximately intersected by the axis of the straight arm so that the arm pivots about an axis passing approximately through the arm itself. In general, the lever system in any rangefinder is arranged to fit the space available and to have reasonably large (and hence precise) mechanical movements to provide the small angular movements of the ranging mirror. The present invention lends itself particularly well to meeting such requirements.

Other objects and advantages of the invention will be apparent from the following description when read in connection with the accompanying drawings in which.

Figure 1:
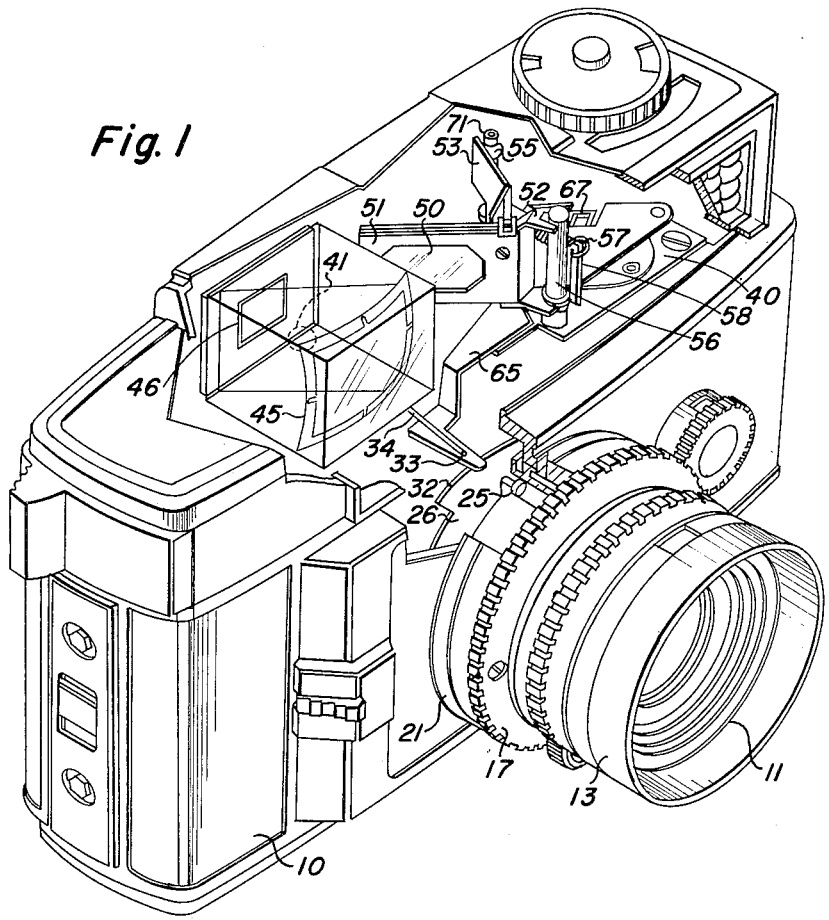
Fig. 1 is a perspective view of a camera partly broken away to show the essential features of a preferred embodiment of the invention.
Figure 2:
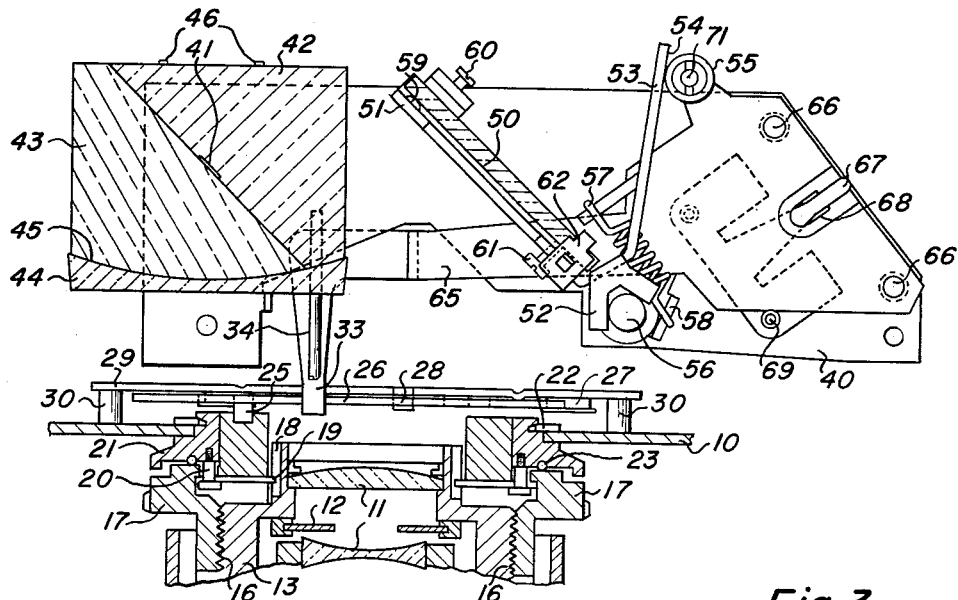
Fig. 2 is a plan view of these essential features.
Figure 3:
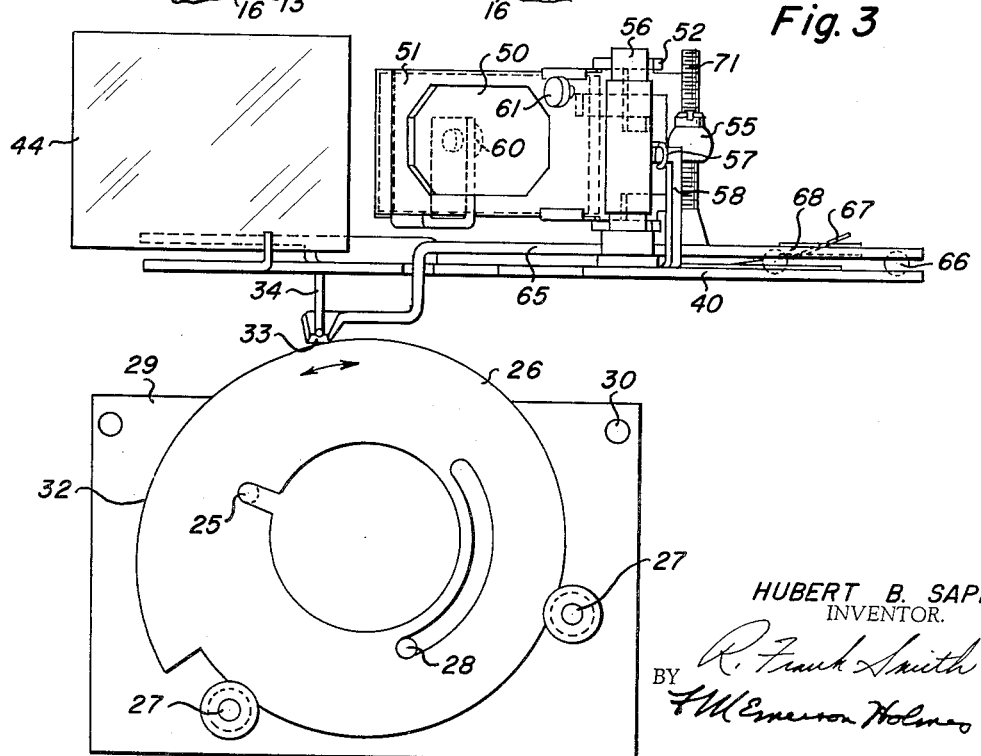
Fig. 3 is a front view thereof.

In the embodiment shown in Figs. 1, 2 and 3 a camera having a housing 10 is provided with a lens 11 of which only two elements are shown in Fig. 2. This lens is carried in a suitable mount 13 provided with a diaphragm 12 and all of the other usual features, not pertinent to the present invention and not shown in detail. The lens mount 13 has a screw thread 16 engaging a focusing mechanism 17 which is rotated in the usual manner. Rotation of the mount 13 itself is prevented by a key 19 and a keyway 18 in the mount 13. Since 13 cannot rotate, rotation of the focusing mechanism 17 causes the lens 11 and mount 13 to move axially for focusing.

In the arrangement shown, the lens is unchangeable. A clamping ring 21 is inserted into the camera housing 10 and held in place by a flat member 22 which fits into a beveled group in the ring 21 and clamps it to the camera 10. The focusing ring 17 and the key member 19 are both fastened to the ring 21 by screws 20 which extend through curved slots in the member 17 to permit rotation of the latter. Ball bearings 23 permit rotation of the member 17 relative to the member 21. A pin 25 carried by the focusing ring 17 extends into a slot in an annular plate 26 part (specifically 119°) of whose periphery 32 constitutes the range cam. The plate 26 rotates on precise bearings 27 which engage the periphery of the plate, but not the cam part thereof. The periphery is circular throughout 241° and this is the part riding on the bearings 27. A limiting pin 28 extends through, but does not touch the sides of, a curved slot in the plate 26. This serves to confine rotation of the plate 26 to the 110° in which the cam is operable. The bearings 27 and the pin 28 are carried by a plate 29 which is fastened by posts 30 directly to the wall 10 of the camera. A cam follower 33 is urged by a spring member 34 into contact with the cam part of the periphery 32 of the plate 26. Thus rotation of the plate 26 causes the cam follower 33 to move up and down.

The rangefinder consists of a fixed vertical mirror in the form of a semi-transparent spot 41 on the interface between two prisms 42 and 43. The movable mirror of the rangefinder is the front surface 50 of a reflector which is also vertically mounted. The mount 51 for the movable mirror includes two V-shaped parts 52 which engage a vertical pivot 56. The movable mirror mount also includes a portion 53 having a surface 54 hereinafter referred to as the control surface.

The whole rangefinder system is mounted on a member 40 which is rigid with respect to the camera 10 and which supports the prisms 42 and 43. An upright portion 58 of the mount 40 provides a securing point for a spring 57 engaging the movable mirror mount so as to urge the mount into contact with its vertical pivot 56 and also to urge the control surface 54 into contact with a spherical nut 55 referred to as a pusher element.

In this embodiment, the infinity setting adjustment of the movable mirror 50 to make it strictly parallel to the fixed mirror 41 is provided by a set screw 60 against which one end of the mirror 50 is urged by a light spring 59. Similarly "halving" adjustment tilting the mirror 50 about an approximately horizontal axis is provided by a set screw 61 against which the upper edge of the mirror is urged by another light spring 62.

The cam follower 33 is part of a second pivoted member 65 which is pivoted on balls 66 resting in holes in the fixed mount 40. The second member is held against these balls 66 by a spring member 67 which is fastened to the plate 40 by rivets 69 and which extends through a hole 68 in the member 65 so that the clamping action of the spring 67 is substantially at the axis of rotation itself so as to provide no unwanted moment of force about this axis. Actually the point of contact is not quite on the axis of rotation but is purposely off axis slightly, in the direction of the cam follower 33 so that the force exerted by the spring 67 adds to the force provided by the spring 34 rather than being in the opposing direction.

The pusher element 55 is conveniently but not necessarily spherical and is carried on a straight arm 71 which extends upward from the second member 65. In the arrangement shown, the arm 71 and the control surface 54 are both vertical at infinity setting. This is desirable but not absolutely necessary. The important point is to have these two elements (the arm and the surface) strictly parallel (they could even be curved and parallel) when the movable mirror is at the infinity setting, i.e. when it is parallel to the fixed mirror 41. If the straight arm 71 is strictly parallel to the control surface 54, then adjustment of the pusher element up and down the straight arm 71 does not affect the infinity setting. The pusher element 55 in the form of a spherical nut must be concentric (not eccentric) for continuous precision, but even this is not absolutely necessary since the pitch of the thread on the arm 71 is so fine that it is never necessary to make adjustments of less than one full turn of the nut. Hence if the nut happens to be eccentric, it does not matter.

At settings, other than infinity, of course, the arm 71 is tipped from this parallel position and any adjustment of the pusher element 55 along the arm 71 changes the setting of the rangefinder for this other condition.

In a very small percentage of cases, a part of an assembly (such as the follower 33) may be bent so slightly that it passes inspection and yet causes the arm 71 to be slightly off from parallel to the surface 54 when the cam is set at infinity setting and when the infinity adjustment is made with set screw 60. This shows up only after the pusher element is adjusted to give the correct setting at 4 feet and the cam is then turned back to infinity to check the latter setting. However, a second order advantage of the present invention now comes into play and the instrument can be adjusted to well within quality tolerances by making a readjustment of the infinity setting (screw 60) and a subsequent readjustment at the four foot setting. This special advantage is not needed in the majority of units but it is nice to have if required.

In this particular embodiment the fixed mirror 41 is located in the middle of the viewfinder field. The compound prism is made up of three parts 42, 43 and a plano concave element 44 cemented to the front thereof. Elements 43 and 44 are made of the same glass so that there is no power at the surface 45. However, the outer zones of this surface are made reflecting, or the whole surface may be made semi-reflecting, and is curved to focus on reflecting reticle elements 46 on the rear surface of the prism 42. The eye of the observer sees a virtual image of the reticle image 46 located "at infinity" so that this viewfinder is parallax free and independent of the position of the eye of the observer. That is, the frame lines appear on the object being viewed. The present invention is not concerned with the viewfinder.

This particular embodiment of the invention has a special advantage in having the pivot point 56 of the movable mirror well forward and located so that as the rangefinder is focused for near distances, the movable image (as framed by a stationary window in front of the movable mirror 50) continues to be well centered on the field of view defined by the viewfinder. This last feature is not critical to the operation of the present invention, but it is somewhat preferable to have the ranging field move so that it remains fairly well centered throughout its range.

The exact shape of the cam 26 depends of course on the various elements of the lever system and the focal length of the lens. Sometimes rangefinder cams are designed empirically but a formula can be worked out by direct (although lengthy) trigonometry. The following description gives the cam shape both ways, i.e. by formula and by one specific example. It is noted that this cam is approximately a circle-decentered.

For a lens of 50 mm. focal length focused by a focusing thread 16 whose pitch is .14632 inch per thread, let the distance the lens moves forward from the infinity setting be L. The object distance D is measured from the film plane. L is zero when D is infinity. The angle subtended by the rangefinder base at the object is $\theta$; the movable mirror is turned from the "parallel" position an angle $\theta/2$; $\theta$ is zero when D is infinity. The movement of the spherical ball 55 is best described in terms of its horizontal component X; it actually rotates so that it also has a slight vertical movement. The angular rotation of this ball and the arm 71 (which is of course the angular rotation of the whole member 65) is defined as $\beta$. The factor to be determined is the radius R of the periphery 32 measured from the axis of the lens, i.e. from the center of the non-cam portion of the periphery 32.

This focusing system turns 110° to focus the 50 mm. focal length lens from $\alpha$ to 2½ feet. The cam extends to a total of 119° to provide extra tolerances in manufacture and assembly. In general the spherical ball is about .435 inch above the axis of rotation of the second member 65 (it is adjusted as discussed above) and is .145 inch horizontally offset from that axis toward the control surface. The formula (written out as separate stages of an equation, so as to be useful for actual computation) is:

$$\beta = \frac{1.1240 - 2.0668 \sin(9°14'31'' - \beta)}{.96593} - .0200$$

$$= 1.1436 - 2.1398 \sin(9°14'31'' - \beta)$$

where $$\beta = \cos^{-1} \frac{.145 - X}{.46109} - 71°40'16''$$

where $$X = \frac{.1 + .76494 \sin\left(8°46' + \frac{\theta}{2}\right)}{\sin\left(44°2' - \frac{\theta}{2}\right)} - .3116$$

where $$\theta = \cos^{-1} \frac{-1.92740 \pm \sqrt{4D^4 - 9.328D^3 + 17.72740D^2 - 14.3292D + 3.71487}}{2D^2 + 2.332D - 6.14460}$$

where $$D = \frac{3.79786}{L} + L + 3.4626$$

and $$L = .14632 \frac{A}{110}$$

where A is the angular distance along the cam being defined.

Applying this to an actual set of camera dimensions using the 50 mm. focal length lens and .14632 focusing thread specified above, one has for example the following dimensions. A radius from the lens axis (see Fig. 3) to the contact 33 is 15° from the vertical.

The angle of turn of the member 65 depends on the distance of the point 33 from the axis through the balls 66 measured perpendicular to this axis. The horizontal component of this distance is 2.132 inches and the vertical component (the distance of the axis through 66 above the point 33 at infinity setting) is .351 inch. The distance itself is 2.161 inches.

Rotation of the member 65 moves the ball 55 more or less horizontally (i.e. rotates it about the axis through balls 66). This ball 55 (pusher element) has a radius of .200 inch. It is on an arm 71 which is (centered). .075 inch from the pivot 56. The control surface 54 is vertical and (at infinity setting) is at an angle of 8°46' to the forward direction i.e. to the optic axis. The rotation axis (66) is at 37°12' to the forward direction, so that the ball 55 moves in a plane at 44°2' to the surface 54.

The mirror 50 is, of course, at 45° to the forward direction at infinity setting; hence is at 53°46' to the control surface 54.

The non-cam part of the periphery 32 has a radius of .79434 inch. Thus with the cam set at infinity setting as shown in Fig. 3, the cam follower 33 is .79434 inch from the optic axis of the lens. With this point of the cam being taken as zero degrees, the cam has the following shape, R being the cam radius measured from the optic axis.

| Degrees | Inches | Degrees | Inches |
|---|---|---|---|
| 0 | .79434 | 60 | .86685 |
| 10 | .80634 | 70 | .87832 |
| 20 | .81887 | 80 | .88959 |
| 30 | .83119 | 90 | .90065 |
| 40 | .84328 | 100 | .91150 |
| 50 | .85517 | 110 | .92215 |

The cam is actually continued beyond the 110° (i.e. beyond the standard 2½ foot setting) up to .92741 at 115° or up to .93157 at 119°, in actual manufacture. All of this data relative to the cam is given merely as one preferred example. The design of the cam is according to standard practice and is not part of the present invention, which is applicable to any coupled rangefinder system.

Figure 4:
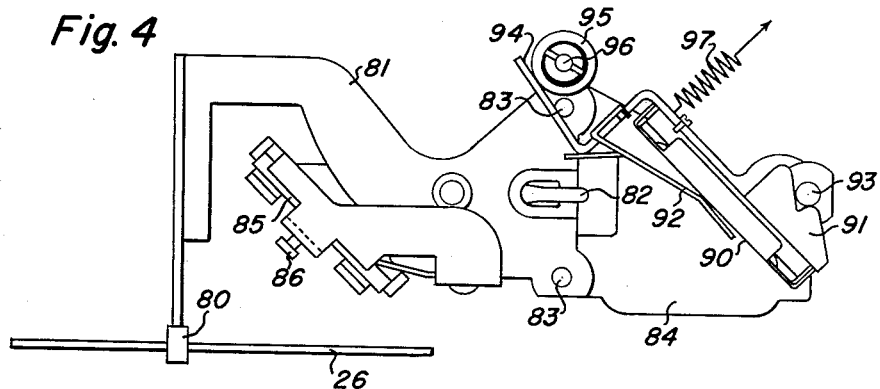
Fig. 4 is a similar plan view of a second embodiment of the invention.
Figure 5:
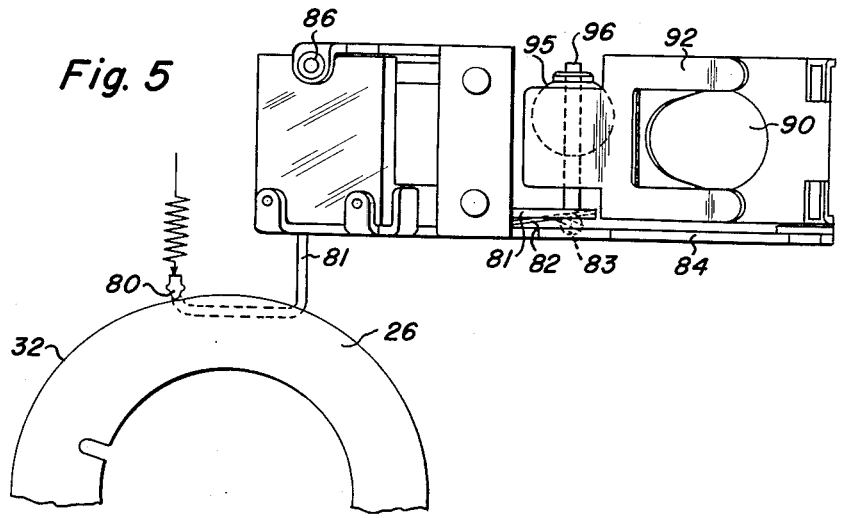
Fig. 5 is a front elevation of the essential features shown in Fig. 4.

The embodiment of the invention shown in Figs. 4 and 5 operates in essentially the same way as that shown in Figs. 1, 2 and 3. The cam 26 moves a cam follower 80 and thus pivots the member 81 about an axis defined by two balls 83 against which the member 81 is held by a spring 82. The support 84 for the rangefinder system carries a fixed semi-transparent mirror 85 and in this embodiment it is the fixed mirror 85 which is adjusted by a set screw 86 for halving, i.e., for vertical adjustment. The movable mirror 90 held in its mount 91 by a spring 92 is rotatable about a vertical pivot 93 carried on the fixed support 84. A control surface 94 on the mount 91 engages a pusher element 95 adjustable along a straight arm 96 which is rigidly attached to the movable member 81. As in the first embodiment, a single spring 97 urges the mount 91 into contact with its pivot 93 and urges the control surface 94 into contact with the pusher member 95. Also the axis of rotation of the member 81 (i.e. through the balls 83) intersects the axis of rigid arm 96. However, the axis of rotation through the balls 83 is parallel to the optic axis of the lens (not shown in Figs. 4 and 5) rather than oblique thereto as in the former embodiment. In this case, however, the control surface 94 is at a considerable angle to the optic axis of the system and hence when the pusher element 95 rotates about an axis parallel to the optic axis and moves along the surface 94 as they both move.

The invention has been described in detail with particular reference to preferred embodiments thereof, but it will be understood that variations and modifications can be effected within the spirit and scope of the invention as described hereinabove and as defined in the appended claims.

I claim:

1. In a camera having a focusing mechanism, a rangefinder for triangulating in a plane hereinafter referred to as horizontal, comprising a support on the camera for supporting the rangefinder, a range cam operative vertically connected to and moved by the focusing mechanism, a fixed mirror and a movable mirror, means carried by the support for mounting the mirrors vertical, separated and parallel at one setting of the movable mirror, the mounting means for the movable mirror including a vertical pivot on the support about which the mirror rotates for ranging, a second member pivoted horizontally on the support engaging, and being rotated about the horizontal pivot by, said range cam, a straight approximately vertical arm rigidly on said second member, a pusher element mounted on, and adjustable along, said arm and engaging a flat surface on the mounting means of the movable mirror for rotating the latter about said vertical axis, when said second member is rotated by said range cam, said arm and surface being parallel when the mirrors are parallel, and means for urging said surface into contact with said pusher element.

2. A rangefinder according to claim 1 in which the pivot axis of said second member is at an acute angle to said surface whereby the pusher moves along said surface as both move.

3. A rangefinder according to claim 1 in which the vertical pivot is a rod against which the mounting means for the movable mirror presses and in which a single spring acts horizontally both as the means for urging the surface against the pusher element and as the means for urging said mounting means against the vertical pivot.

References Cited in the file of this patent

UNITED STATES PATENTS

| | | |
|---|---|---|
| 1,178,474 | Becker | Apr. 4, 1916 |
| 2,267,811 | Brownscombe | Dec. 30, 1941 |
| 2,302,584 | Steiner | Nov. 17, 1942 |
| 2,526,522 | Wallendorf | Oct. 17, 1950 |
| 2,641,157 | Schwartz et al. | June 9, 1953 |
| 2,746,368 | Weiss | May 22, 1956 |
| 2,902,913 | Smith et al. | Sept. 8, 1959 |